(12) United States Patent
Tian et al.

(10) Patent No.: US 12,615,417 B2
(45) Date of Patent: Apr. 28, 2026

(54) DECISION-BASED MODEL GENERATION FOR VIDEO DELIVERY

(71) Applicant: Beijing YoJaJa Software Technology Development Co., Ltd., Beijing (CN)

(72) Inventors: Chenyu Tian, Beijing (CN); Tongyu Dai, Beijing (CN); Lemei Huang, Beijing (CN); Si Chen, Beijing (CN)

(73) Assignee: Beijing YoJaJa Software Technology Development Co., Ltd., Beijing (CN)

( * ) Notice: Subject to any disclaimer, the term of this patent is extended or adjusted under 35 U.S.C. 154(b) by 72 days.

(21) Appl. No.: 18/483,920

(22) Filed: Oct. 10, 2023

(65) Prior Publication Data

US 2025/0106475 A1 Mar. 27, 2025

Related U.S. Application Data

(63) Continuation of application No. PCT/CN2023/120586, filed on Sep. 22, 2023.

(51) Int. Cl.
| | |
|---|---|
| *H04N 21/466* | (2011.01) |
| *G06F 18/243* | (2023.01) |
| *H04N 21/238* | (2011.01) |
| *H04N 21/266* | (2011.01) |
| *H04N 21/2662* | (2011.01) |

(52) U.S. Cl.
CPC ... *H04N 21/4665* (2013.01); *G06F 18/24323* (2023.01); *H04N 21/238* (2013.01); *H04N 21/266* (2013.01); *H04N 21/2662* (2013.01)

(58) Field of Classification Search
CPC ............. H04N 21/4665; H04N 21/238; H04N 21/266; H04N 21/2662; H04N 21/47217; G06F 18/24323
USPC ........................................................ 725/116
See application file for complete search history.

(56) References Cited

U.S. PATENT DOCUMENTS

| | | | | |
|---|---|---|---|---|
| 2003/0139963 A1* | 7/2003 | Chickering | ........ | G06Q 30/0207 |
| | | | | 705/14.1 |
| 2015/0012465 A1* | 1/2015 | Pingenot | ................ | G06N 5/025 |
| | | | | 706/12 |
| 2018/0198694 A1* | 7/2018 | Wells | ....................... | H04L 43/08 |
| 2018/0308124 A1* | 10/2018 | Gao | ................... | G06Q 30/0251 |
| 2019/0392264 A1* | 12/2019 | Wang | .................... | G06T 17/005 |
| 2020/0202997 A1* | 6/2020 | Hadad | .................... | G16H 50/70 |

* cited by examiner

*Primary Examiner* — Benjamin R Bruckart
*Assistant Examiner* — Alexander Boyd
(74) *Attorney, Agent, or Firm* — Kwan & Olynick LLP

(57) ABSTRACT

In some embodiments, a method receives a data structure for an auto decision process for predicting a value for a decision feature of a plurality of features. The data structure is generated using a decision aware splitting process that splits a node in the data structure using the decision feature and a metric-based process that splits other nodes of the data structure by evaluating features in the plurality of features using a metric. Feature values are determined for a combination of features for a playback session. The method evaluates the data structure using the combination of features to determine a plurality of prediction values for a plurality of feature values of the decision feature. The prediction values are used to generate a decision for the playback session by selecting a feature value in the plurality of feature values based on the plurality of prediction values.

20 Claims, 10 Drawing Sheets

500

| Index | Network | City | CDN | Label |
|-------|---------|------|-----|-------|
| 1 | 4G | Paris | B | 1 |
| 2 | 4G | London | B | 0 |
| 3 | 4G | London | B | 0 |
| 4 | Wi-Fi | London | B | 1 |
| 5 | Wi-Fi | London | B | 1 |
| 6 | Wi-Fi | London | B | 1 |
| 7 | Wi-Fi | London | A | 1 |
| 8 | Wi-Fi | Paris | A | 0 |

| Index | Network | City | Prediction when CDN is B | Prediction when CDN is A |
|-------|---------|------|--------------------------|--------------------------|
| 9 | 4G | London | 0 | 1 |
| 10 | 4G | Paris | 0 | 0 |
| 11 | Wi-Fi | London | 1 | 1 |
| 12 | Wi-Fi | Paris | 1 | 0 |

DECISION-BASED MODEL GENERATION FOR VIDEO DELIVERY

CROSS REFERENCE TO RELATED APPLICATIONS

This application is a continuation application and, pursuant to 35 U.S.C. § 120, is entitled to and claims the benefit of earlier filed application International App. No. PCT/CN2023/120586, filed Sep. 22, 2023, entitled "DECISION-BASED MODEL GENERATION FOR VIDEO DELIVERY", the content of which is incorporated herein by reference in its entirety for all purposes.

BACKGROUND

In a content delivery system (e.g., streaming system), auto decision processes are used to optimize the streaming experience. For example, the content delivery system may need to select a content delivery network (CDN) that will deliver content to a client device and also an initial profile from a plurality of profiles. The content delivery network is a network that will deliver content to the client device. A profile is one of multiple profiles that are encoded using different levels of characteristics, such as bitrate and resolution. In some examples, during the initial stage of a playback session, the content delivery system may use an auto decision process to select the content delivery network. The content delivery network that is selected may be considered the optimal content delivery network to deliver the instance of content given a set of features for the playback session. Also, the content delivery system may use an auto decision process to select an initial profile for the playback session. The initial profile that is selected may be considered the optimal profile to start the playback session given a set of features for the playback session. A client device would then use the content delivery network and the initial profile to start the streaming of the content. Also, during playback, an auto decision process may be used to determine whether content delivery networks should be changed during the session. For example, the auto decision process may determine whether to switch from a content delivery network #1 to a content delivery network #2 when content delivery network #2 may offer better playback conditions. Further, an auto decision process, which may be known as an adaptive bitrate algorithm, may dynamically select the bitrate for upcoming segments. As can be seen, multiple auto decision processes may be used in a playback session.

The above auto decision processes may select the optimal decision based on a performance prediction of each possible decision. For this selection to be effective, the prediction should capture the differences between the decisions accurately. A data structure that can predict the performance of decisions is a tree structure. However, there is a challenge in developing a tree structure that is cost-effective and discriminating. For example, to predict the performance of decisions, the decision may be included as an additional feature in the tree structure, where the prediction may predict the performance of the decision feature. A tree structure may be generated during a training process. Using training data, the tree structure may be generated by selecting features as nodes that lead to the most information gained. However, when generating a tree structure to select features that lead to the most information gained, the decision feature may be ignored if it fails in competing with other more informative features. This results in a tree structure that has a lack of discrimination for the decision feature. If the feature of the content delivery network is the decision feature, the prediction may not discriminate which of the content delivery networks is more optimal based on the same input. One way to avoid this problem is to build separate prediction models for each decision, such as a separate prediction model for each content delivery network may be built. However, this incurs a linear cost increase with the number of decisions. Also, when multiple decisions are needed at the same time, such as content delivery network selection and initial profile selection, the decision space increases dramatically, which results in increased cost to store the tree structures and also generate the predictions.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

FIG. 5 depicts an example of a table of training data according to some embodiments.

DETAILED DESCRIPTION

Described herein are techniques for a content delivery system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

System Overview

A content delivery system may use a prediction system that may predict the performance of a decision feature for different aspects of the delivery of content (e.g., streaming of content). For example, the prediction may be generated for decisions that are required for the delivery or playback of content. In some embodiments, the prediction system may use a unified model (e.g., a single model) that includes the decisions as additional features. This may be different from using separate models for each decision, which may be cost ineffective. Using a unified model with the decisions as additional features may use less storage to store the single model and also fewer computing resources to run the single model compared to using multiple models. Although the prediction system is discussed with respect to content delivery, the model may be generated for use in other areas, such as where auto decisions are being predicted.

In some embodiments, the prediction system uses a data structure that can predict the performance of decisions. In some embodiments, the data structure may be a decision tree structure, but other models may be used. The tree structure may be a set of rules that are formed by its structure of nodes and links between the nodes. When the prediction system generates a prediction for an input, the prediction system starts at a root node and follows the branches of the tree structure based on the values of the features of the input until a leaf node is reached that provides the final prediction.

The prediction system may use a training phase and an inference phase. In the training phase, training data with labels may be used to build the tree structure. In the inference phase, the constructed tree structure is deployed to predict the performance of decisions. The prediction system may improve the generation of tree structures by using a decision aware splitting process that splits a node to ensure the tree structure discriminates between decisions. This improves a tree structure that may have lacked discrimination between decisions. As will be discussed below, the prediction system may generate the tree structure using a decision aware splitting process and a gain-based splitting process.

System

Figure 1:
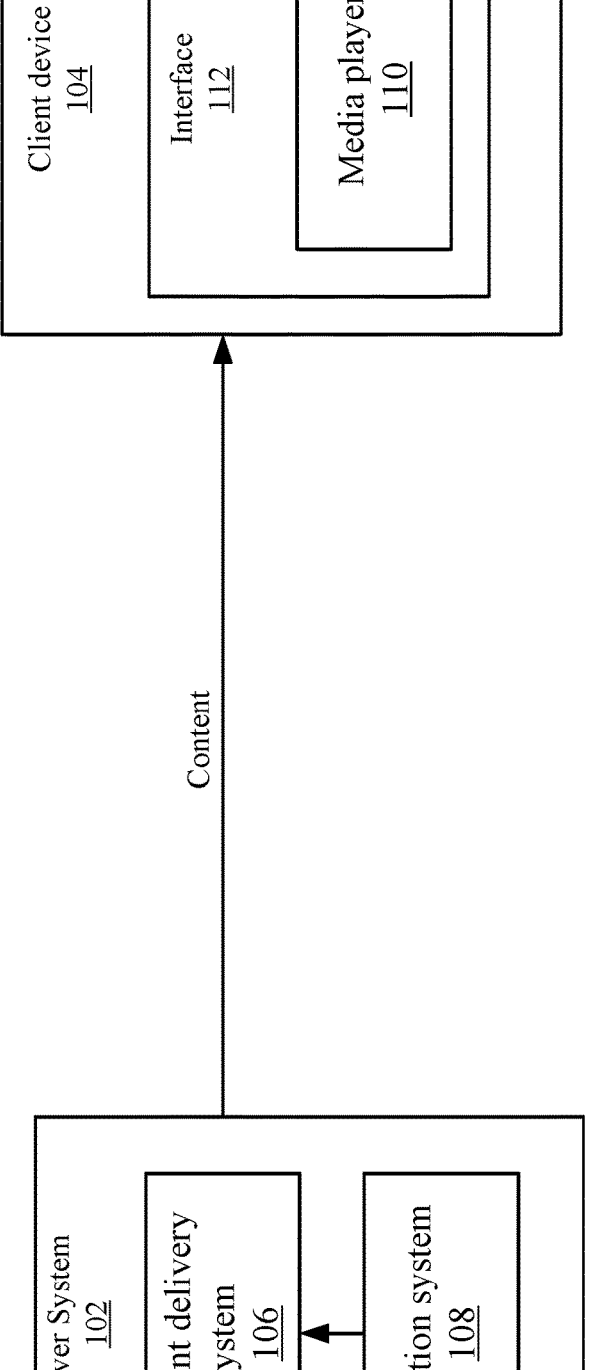
FIG. 1 depicts a simplified system for delivering content according to some embodiments.

FIG. 1 depicts a simplified system 100 for delivering content according to some embodiments. System 100 includes a server system 102 and a client device 104. Although a single instance of server system 102 and client device 104 are shown, multiple instances of server system 102 and client device 104 may be appreciated. For example, multiple client devices 104 may be requesting content from a single server system 102 or multiple server systems 102.

Server system 102 includes a content delivery system 106 that may facilitate the delivery of content to client device 104. For example, content delivery system 106 may communicate with multiple content delivery networks (not shown) to have content delivered to multiple client devices 104. A content delivery network includes servers that can deliver content to client device 104. In some embodiments, the content delivery network delivers segments of video to client device 104. The segments may be a portion of the video, such as six seconds of the video. A video may be encoded in multiple profiles that correspond to different levels, which may be different levels of bitrates or quality (e.g., resolution). Client device 104 may request a segment of video from one of the profile levels based on current network conditions. For example, client device 104 may use an adaptive bitrate algorithm to select the profile for the video based on the estimated current available bandwidth and other network conditions.

Client device 104 may include a mobile phone, smartphone, set top box, television, living room device, tablet device, or other computing device. Client device 104 may include a media player 110 that is displayed on an interface 112. Media player 110 or client device 104 may request content from the content delivery network. In some embodiments, the content may be video, audio, or other content. Media player 110 may use an adaptive bitrate system to select a profile when requesting segments of the content. In response, the content delivery network may deliver (e.g., stream) the segments in the requested profiles to client device 104 for playback using media player 110.

A profile ladder may be provided to client device 104 for segments that can be requested. The profile ladder may list different profiles for each segment. The adaptive bitrate system may use an adaptive bitrate algorithm to determine which profile to select for each segment. Client device 104 can send requests for segments that are associated with a profile. For example, client device 104 may use identifying information for a profile to request a segment. The content delivery network may then send the segment of video for the requested profile to client device 104, which can then display the segment in media player 110 on interface 112. Client device 104 may change the profiles that are requested for segments based on current network conditions.

The above system may require decisions to be made based on predictions. A prediction system 108 may generate predictions for decisions of a decision feature using a tree structure, and select one of the decisions for the decision feature. Prediction system 108 may perform a training phase to generate the tree structure and an inference phase to generate predictions using the tree structure. The training phase may use a decision aware training process that builds a tree structure that discriminates between values of a decision feature.

A tree structure may include multiple nodes that are split based on associating a feature with a respective node and the different values associated with the feature. For example, if a node is associated with a feature of a content delivery network, and there are two content delivery networks, such as a content delivery network A and content delivery network B, the node may be split into two leaf nodes. A first branch to a first leaf node may be associated with the value of content delivery network A and a second branch to a second leaf node may be associated with the value of content delivery network B.

A decision aware splitting process may force a split of a node based on the decision feature. If the decision feature is the prediction of the performance of content delivery networks, prediction system 108 may split a node, such as a root node, of the tree structure based on the decision feature of content delivery network values (e.g., content delivery network A and content delivery network B). Then, prediction system 108 may use another process that evaluates features differently from the decision aware splitting process. In some embodiments, the process may be a metric-based process, such as a gain-based splitting process, that splits other nodes based on computed metric values. The gain-based splitting process may be based on selecting a feature for the node based on how much information is gained by assigning that feature to the node compared to other features. Different processes may be used to measure the information gain of features for the nodes, which will be described below.

A resulting tree structure may be decision aware in that it discriminates between the decisions of the decision feature. The tree structure discriminates between decisions of the decision feature by ensuring that decisions of the decision feature (e.g., each decision) are associated with a separate subtree thereby preserving the individuality and differences between decisions. As discussed above, the splitting of a root node of the tree structure based on content delivery network A and content delivery network B may associate each content delivery network with a subtree of the decision tree. This improves the tree structure that is generated because a tree structure may not lose the discrimination between decisions when using a single tree structure. This tree structure is different from the tree structure discussed in the Background that may not associate the decision feature with a node in the tree structure thereby causing the tree structure in the Background to lack discrimination for the decision feature. Also, the present tree structure may improve cost and use less computing resources because multiple tree structures are not needed for each decision (e.g., two tree structures are not needed if there are two content delivery networks for the decision feature). This cost and resource usage is incrementally increased as the number of processes use auto-decision predictions.

The tree structure may be used in the real-time delivery of content. As described above, the tree structure may be used to select an initial content delivery network for a playback session, an initial profile, determine whether to switch from a content delivery network to another content delivery network, or dynamically select the bitrate for upcoming segments. In the example of selecting an initial content delivery network for a playback session, a tree structure is generated using features, such as network (e.g., 4G or Wi-Fi), city (e.g., Paris or London), or content delivery network (A or B). Depending on the feature values of the playback session, prediction system 108 generates a prediction using the tree structure. For example, the prediction may be whether rebuffering will occur when content delivery network A or content delivery network B is used. In some examples, if the feature values are 4G and London, prediction system 108 may generate a prediction of no rebuffering if content delivery network A is selected and rebuffering will occur if content delivery network B is selected. Prediction system 108 may then select content delivery network A because it is predicted that no rebuffering will occur given the feature values of the playback session and may result in a better playback experience.

The following will now describe a tree building method followed by a decision aware splitting process and a gain-based splitting process.

Tree Building Method

Figure 2:
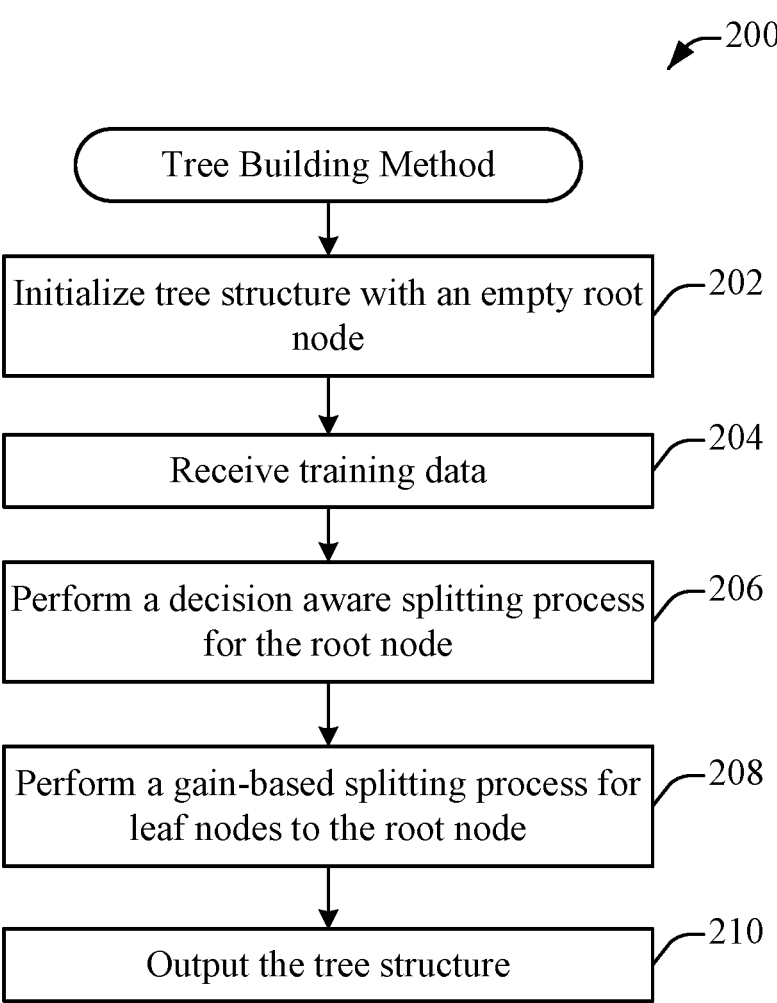
FIG. 2 depicts a simplified flowchart of a method for building a tree structure according to some embodiments.

FIG. 2 depicts a simplified flowchart 200 of a method for building a tree structure according to some embodiments. At 202, prediction system 108 initializes a tree structure with an empty root node. The root node may be a topmost node of the tree structure.

At 204, prediction system 108 receives training data. The training data may be historical data from the delivery of content using content delivery system 106, or other types of training data, such as from other content delivery systems. The training data may include features, such as a network, a city, or a decision feature of content delivery network. As discussed above, the decision feature may be selecting between multiple content delivery networks, such as a content delivery network A and a content delivery network B. The training data may include labels for the prediction. The label may be based on a metric. In some examples, the metric may be whether a rebuffer occurs. The label indicates that rebuffering may have occurred when the respective features for the session occurred when a value of "1" is included and indicates that rebuffering may not have occurred when the respective features for the session occurred when a value of "0" is included. For example, for one session, the network may have been 4G, the city is Paris, and the content delivery network is content delivery network B. The label of "1" indicates that rebuffering occurred. Another session may have the network as 4G, the city as London, and the content delivery network as content delivery network B. The label may be "0" to indicate that rebuffering did not occur. It is noted that the training data is simplified for discussion purposes. In a content delivery system, the training data that is required to determine an accurate tree structure may be larger than a human can analyze. For some content delivery providers, there will be hundreds of millions of views every day. A human user would not be able to learn patterns from the huge amounts of data that could be used for training, but prediction system 108 could analyze the data to generate the tree structure.

At 206, prediction system 108 performs a decision aware splitting process for the root node. Although the root node is described, the decision aware splitting process may be performed with other nodes, such as a leaf node in the tree structure. This may occur when there are more than two values for a decision feature, which will be described below in FIGS. 8A and 8B. Performing decision aware splitting with the root node may ensure that the decision feature is split into distinct subtrees of the tree structure. In some embodiments, if there are two content delivery networks, then the root node is split into two leaf nodes where a first leaf node is associated with content delivery network A and a second leaf node is associated with content delivery network B.

After performing the decision aware splitting process, at 208, prediction system 108 performs another process, such as a gain-based splitting process, for leaf nodes to the root node. Gain-based splitting may evaluate a metric, such as the information gain, for features when associating a feature with a node in the tree structure. For example, information gain quantifies the information provided by a specific feature when assigned to a node within the nodes of the tree structure. In some embodiments, the information gain may be computed as the difference between the initial entropy of a dataset and the entropy after splitting the dataset based on a particular feature. Entropy may measure the uncertainty of the training data. In the gain-based splitting, the feature with the highest information gain is selected for a corresponding node. A higher information gain indicates a more informative feature as it contributes more to reducing the overall uncertainty within the training data. Prediction system 108 may perform the gain-based splitting process for as many leaf nodes as needed based on the training data. For example, there may be a limit on the number of leaf nodes on a level of the tree structure, the number of levels of the tree structure, etc. When the limit is reached, at 210, prediction system 108 outputs the tree structure for use in the content delivery process.

The following will now describe the decision aware splitting process and the gain-based splitting process in more detail.

Decision Aware Splitting Process

Figure 3:
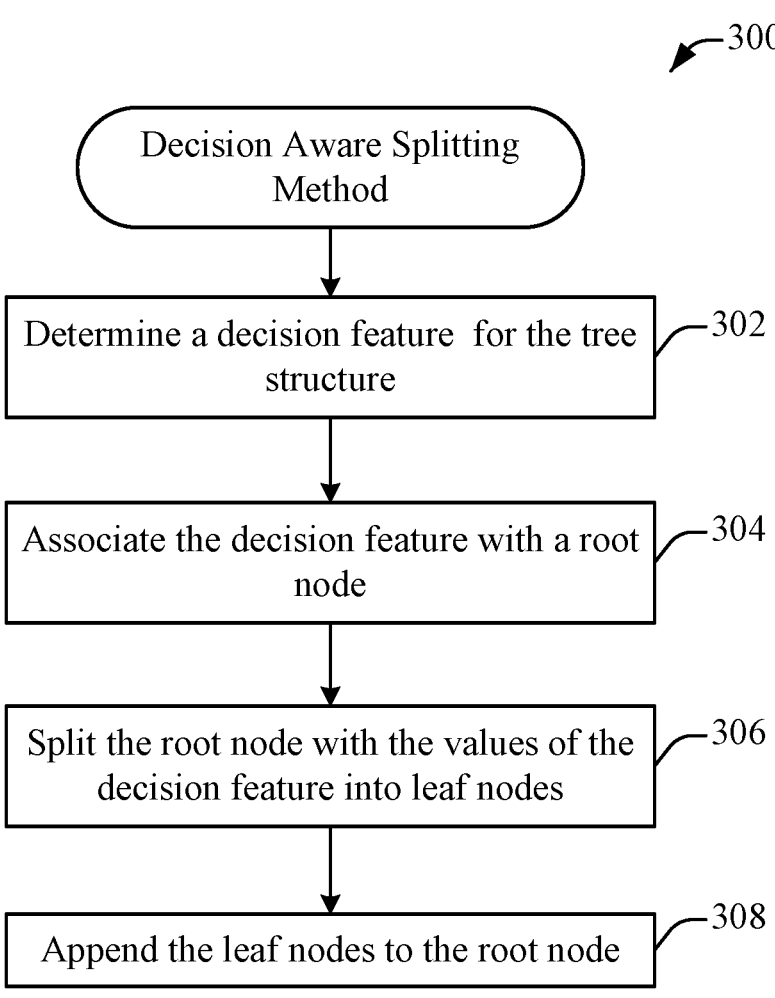
FIG. 3 depicts a simplified flowchart of a method for performing decision aware splitting according to some embodiments.

FIG. 3 depicts a simplified flowchart 300 of a method for performing decision aware splitting according to some embodiments. At 302, prediction system 108 determines a decision feature for the decision tree. In some embodiments, the decision feature may be specified as the decision that should be made by prediction system 108. The tree structure may predict a metric for the values of the decision feature. As described above, prediction system 108 may build a tree structure that predicts a performance of rebuffering that is used to select a content delivery network A or a content delivery network B. In this case, the decision feature is content delivery network, and the values of the decision feature are content delivery network A or a content delivery network B. In other embodiments, if the profile is being selected, the decision feature may be the profiles that could be selected. For example, a profile 1, a profile 2, etc. may be values of the decision feature.

At 304, prediction system 108 associates the decision feature with a root node. For example, prediction system 108 associates the content delivery network feature with the root node.

At 306, prediction system 108 splits the root node with the values of the decision feature into leaf nodes. In the above example, there are two values of content delivery network A and content delivery network B, and prediction system 108 splits the root node into two leaf nodes with one branch for a first leaf node associated with the value of content delivery network A and a second branch for a second leaf node associated with the value of content delivery network B. It is noted that if there are more than two decisions that are possible, then trees with other structures may be constructed. The decision aware splitting process may be executed multiple times, such as sequentially, until each decision has an individual leaf node. An example of a decision tree for more than two decisions is described in FIG. 8B below.

At 308, prediction system 108 appends the leaf nodes to the root node. After performing decision aware splitting, prediction system 108 may then use another process for splitting other nodes, such as a gain-based splitting process, which will now be described.

Gain-Based Splitting Process

Figure 4:
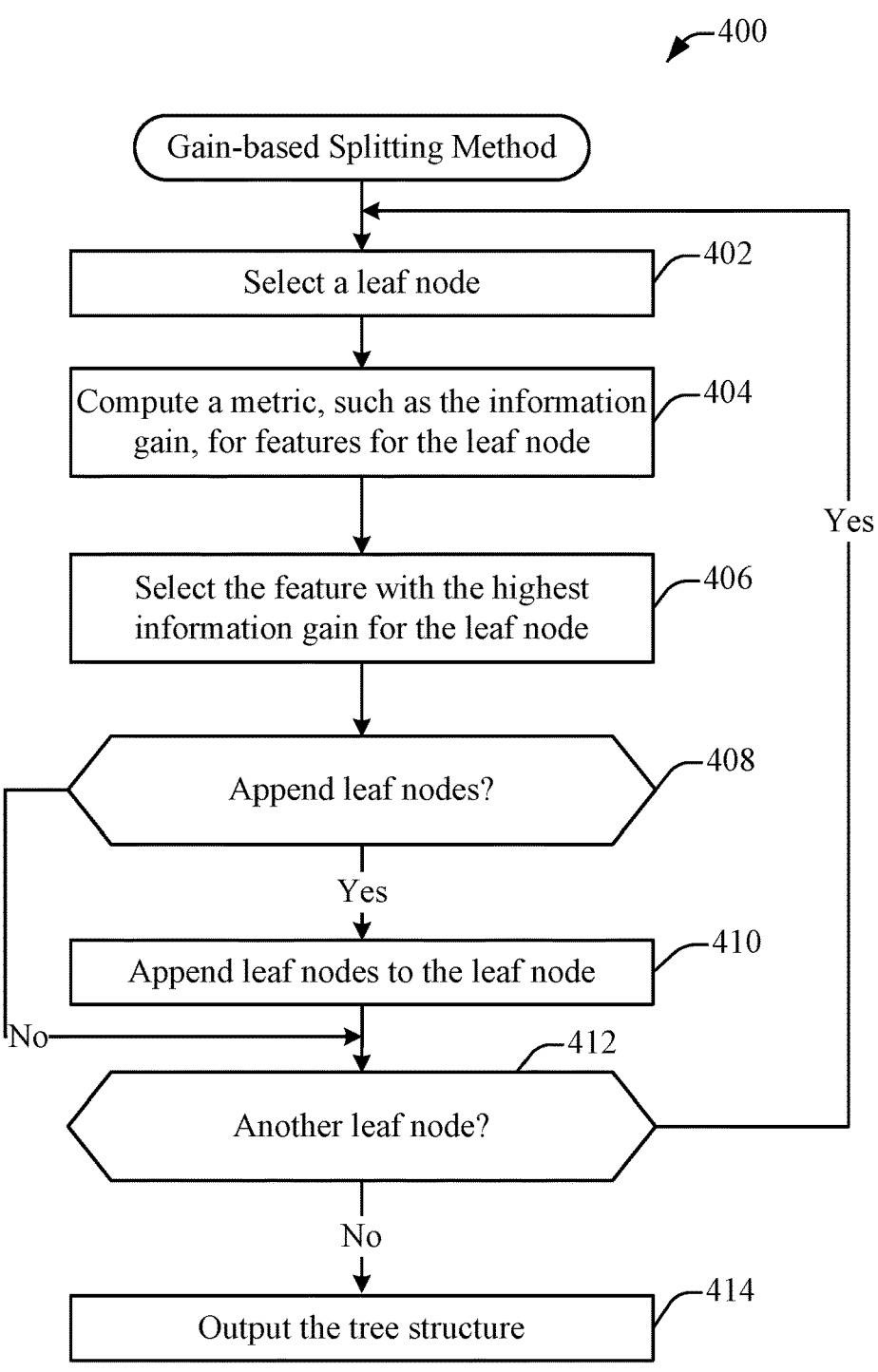
FIG. 4 depicts a simplified flowchart of a method for performing gain-based splitting according to some embodiments.

FIG. 4 depicts a simplified flowchart 400 of a method for performing a gain-based splitting process according to some embodiments. At 402, prediction system 108 selects a leaf node. For example, one of the leaf nodes that is appended to the root node may be selected.

At 404, prediction system 108 computes a metric, such as the information gain, for the features for the selected leaf node. The information gain may measure the information that is provided by the features if the leaf node is split based on the feature. An example of calculating the information gain will be described below.

At 406, prediction system 108 selects the feature with the highest ranked information gain for the leaf node. The highest ranked information gain may be a score that indicates the most information is gained by associating the feature with the node and splitting the training data using the feature at the node. An example of calculating the information gain will be described below. For discussion purposes, the network type may be selected for the leaf node.

At 408, prediction system 108 determines if leaf nodes should be appended to the present leaf node. For example, depending on a criterium for the tree structure, such as a limitation on the number of leaf nodes on a level, a number of levels, etc., additional leaf nodes to the present leaf node may be added or the process may be stopped. If leaf nodes are added, at 410, prediction system 108 appends leaf nodes to the leaf node. If not, 412, prediction system 108 determines if another leaf node needs to be analyzed. If another leaf node needs to be analyzed, the process reiterates to 402, where another leaf node is selected. For example, the second leaf node that was appended to the root node may be analyzed by prediction system 108. Prediction system 108 may analyze the information gain for the features for this leaf node as described above. The above process may continue to be performed as prediction system 108 selects features the highest information gain for leaf nodes. The last level of the leaf nodes may be associated with prediction values. Prediction system 108 may determine the prediction values based on the training data and the labels. For example, prediction system 108 may analyze the training data, and determine the label that should be associated with the leaf nodes in the last level of the tree structure. For example, prediction system 108 may determine that a prediction for a combination of a network of 4G and content delivery network B should be "1". The example below will describe the examples that determine the prediction.

When all the leaf nodes have been processed, at 414, prediction system 108 outputs the tree structure. Content delivery system 106 may then use the tree structure in an inference phase. For example, content delivery system 106 may use the tree structure to select a content delivery network for a playback session by applying values from a playback session for the features to the tree structure to select a content delivery network. In some examples, if the combination of features for a present playback session is network of 4G and a location of London, prediction system 108 may use the tree structure to predict that rebuffering will not occur if content delivery network A is selected and rebuffering will occur if content delivery network B is selected. Content delivery system 106 may then select content delivery network A as the content delivery network for the playback session.

To illustrate the decision aware splitting process and the gain-based splitting process, an example will now be described.

Example

FIG. 5 depicts an example of a table 500 of training data according to some embodiments. Table 500 includes columns 502 to 510 for index, network, city, content delivery network (CDN), and label, respectively. The index may be associated with a playback session and eight indices for eight playback sessions are shown. The network may be associated with a network type that is used during the playback session. The network may be 4G or Wi-Fi. The city may be associated with the city in which client device 104 was located for the playback session. The city is Paris or London in this example. The content delivery network may be the content delivery network that was used in the playback session, which may be content delivery network A or content delivery network B. The label may indicate whether rebuffering occurred during the playback session. A value of "1" indicates rebuffering occurred and a value of "0" indicates rebuffering did not occur.

As shown, each playback session may include a combination of the features. For example, at 512, the playback session index 1 used a 4G network, the city was Paris, and used content delivery network B. The label of 1 indicates rebuffering occurred. At 514, the network used was 4G, the city was London, and content delivery network B was used. The label of 0 indicates that rebuffering did not occur. The other playback sessions also include various combinations of the features and labels.

Figure 6A:
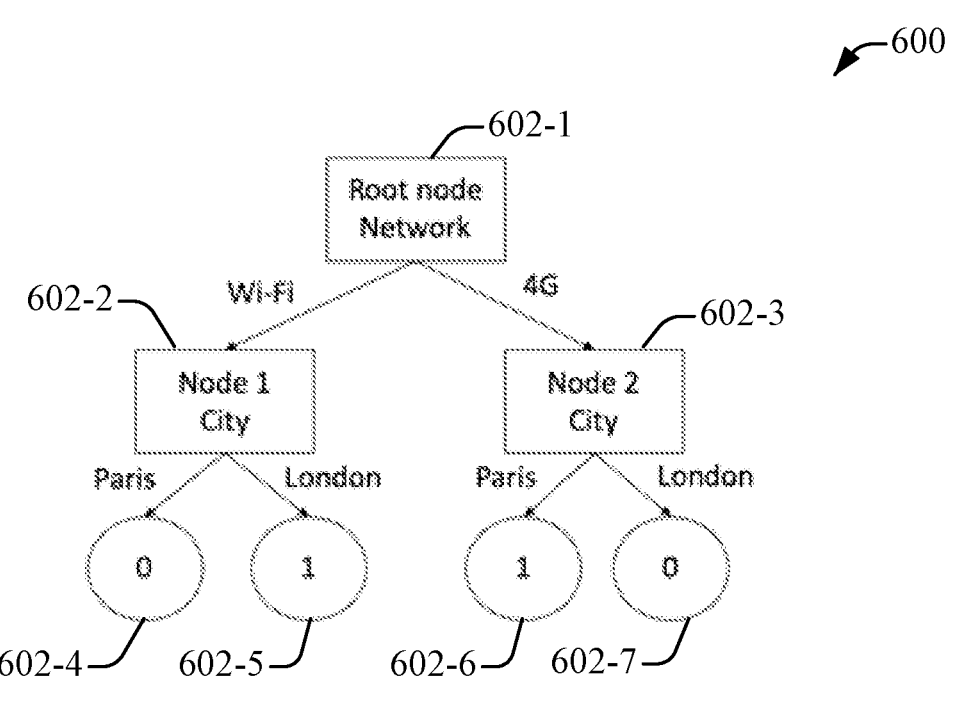
FIG. 6A depicts a tree structure for the features in FIG. 5.
Figure 6B:
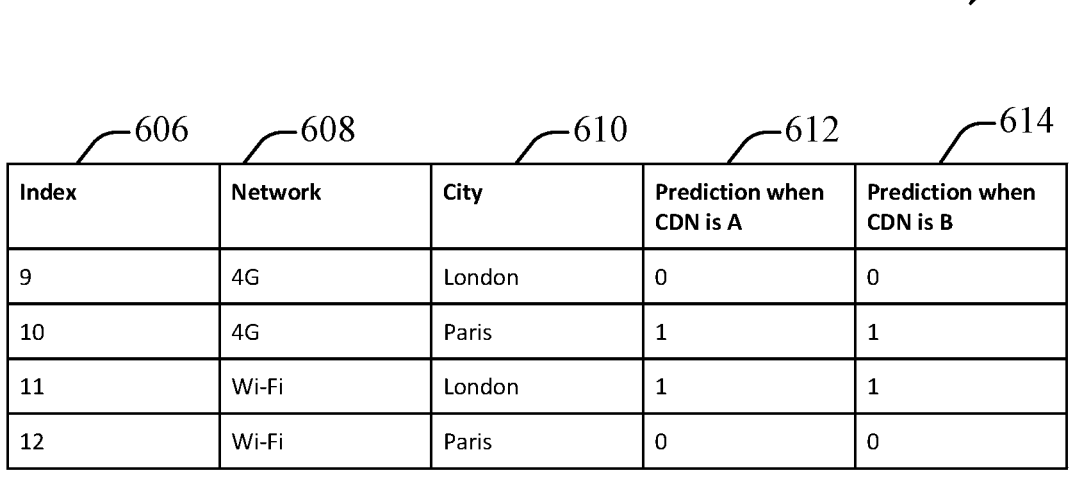
FIG. 6B depicts a table that includes test samples according to some embodiments.

FIG. 6A and FIG. 6B depict an example where a decision aware splitting process is not used. In this example, a gain-based splitting process is used for all nodes. FIG. 6A depicts a tree structure 600 for the features in FIG. 5 using a gain-based splitting process. For the sake of simplicity, a setting that limits the maximum number of leaf nodes on a level to four (that is, on one level of the tree structure, there cannot be more than four leaf nodes) may be used to stop the generation of more levels to the decision tree. At 602-1, for a root node, the information gain is calculated for the features shown in FIG. 5 of network, city, and the decision feature of content delivery network. The information gain may be based on the entropy before and the entropy after when splitting a respective node using the respective feature. Entropy may measure the disorder in the training data. Although information gain is discussed, other processes may be used to generate the tree structure instead of information gain, such as Gini impurity. The following illustrates a calculation of information gain for the root node for the features of network, city, and the decision feature of content delivery network:

Splitting 1, root node, feature network $$\text{Entropy}_{before} = -\frac{3}{8}\log_2\left(\frac{3}{8}\right) - \frac{5}{8}\log_2\left(\frac{5}{8}\right) = 0.95$$

$$\text{Entropy}_{after} = \frac{3}{8} * \left(-\frac{1}{3}\log_2\left(\frac{1}{3}\right) - \frac{2}{3}\log_2\left(\frac{2}{3}\right)\right) +$$

$$\frac{5}{8} * \left(-\frac{1}{5}\log_2\left(\frac{1}{5}\right) - \frac{4}{5}\log_2\left(\frac{4}{5}\right)\right) = 0.81$$

$$\text{Information}_{gain} = \text{Entropy}_{before} - \text{Entropy}_{after} = 0.14$$

Splitting 1, root node, feature city $$\text{Entropy}_{before} = -\frac{3}{8}\log_2\left(\frac{3}{8}\right) - \frac{5}{8}\log_2\left(\frac{5}{8}\right) = 0.95$$

$$\text{Entropy}_{after} = \frac{2}{8} * \left(-\frac{1}{2}\log_2\left(\frac{1}{2}\right) - \frac{1}{2}\log_2\right) +$$

$$\frac{6}{8} * \left(-\frac{2}{6}\log_2\left(\frac{2}{6}\right) - \frac{4}{6}\log_2\left(\frac{4}{6}\right)\right) = 0.94$$

$$\text{Information}_{gain} = \text{Entropy}_{before} - \text{Entropy}_{after} = 0.01$$

Splitting 1, root node, decision feature (CDN)

$$\text{Entropy}_{before} = -\frac{3}{8}\log_2\left(\frac{3}{8}\right) - \frac{5}{8}\log_2\left(\frac{5}{8}\right) = 0.95$$

$$\text{Entropy}_{after} = \frac{2}{8} * \left(-\frac{1}{2}\log_2\left(\frac{1}{2}\right) - \frac{1}{2}\log_2\right) +$$

$$\frac{6}{8} * \left(-\frac{2}{6}\log_2\left(\frac{2}{6}\right) - \frac{4}{6}\log_2\left(\frac{4}{6}\right)\right) = 0.94$$

$$\text{Information}_{gain} = \text{Entropy}_{before} - \text{Entropy}_{after} = 0.01$$

As shown, the information gain for the feature of network may be 0.14, the information gain for the feature of city may be 0.01, and the information gain for the feature of content delivery network may be 0.01. Accordingly, the feature of network may have the largest information gain 0.14. The largest information gain indicates that the feature of network is a more informative feature, as it contributes more to reducing the overall uncertainty within the training data of FIG. 5 if associated with the root node. Accordingly, the root node is split using the feature of network. The splitting of the root node produces two children nodes that contain two groups of data. Referring to FIG. 5, indexes 1-3 include the value of 4G and indexes 4-8 include the value of Wi-Fi. Accordingly, there are two possible values of the feature of network, and two leaf nodes are added for the two values. A leaf node 1 at 602-2 is associated with the value of Wi-Fi and a leaf node 2 at 602-3 is associated with the value of 4G.

After splitting the root node, the leaf nodes may be split separately. Prediction system 108 uses the features of city and content delivery network to calculate the information gain. The value of the feature of network is not evaluated because only one value is associated with each respective subtree. That is, the value of network is Wi-Fi for node 1 and the value of network is 4G for node 2. The following illustrates a calculation of information gain for the leaf node 1 for the features of city and content delivery network:

Splitting 2, node1, feature City $$\text{Entropy}_{before} = -\frac{1}{5}\log_2\left(\frac{1}{5}\right) - \frac{4}{5}\log_2\left(\frac{4}{5}\right) = 0.93$$

$$\text{Entropy}_{after} = \frac{4}{5} * \left(-\frac{4}{4}\log_2\left(\frac{4}{4}\right)\right) + \frac{1}{5} * \left(-\frac{1}{1}\log_2\left(\frac{1}{1}\right)\right) = 0$$

$$\text{Information}_{gain} = \text{Entropy}_{before} - \text{Entropy}_{after} = 0.93$$

Splitting 2, node1, decision feature $$\text{Entropy}_{before} = -\frac{1}{5}\log_2\left(\frac{1}{5}\right) - \frac{4}{5}\log_2\left(\frac{4}{5}\right) = 0.95$$

$$\text{Entropy}_{after} = \frac{4}{5} * \left(-\frac{4}{4}\log_2\left(\frac{4}{4}\right)\right) + \frac{1}{5} * \left(-\frac{1}{1}\log_2\left(\frac{1}{1}\right)\right) = 0.40$$

$$\text{Information}_{gain} = \text{Entropy}_{before} - \text{Entropy}_{after} = 0.55$$

For node 1, the information gain for the feature of city is 0.93 compared to 0.55 for the decision feature of content delivery network. The feature of city contributes a largest information gain and is selected for node 1. Referring to FIG. 5, the indices of 4-8 that have the value of Wi-Fi are used because node 1 is associated with the value of Wi-Fi. Thus, there are two values of Paris and London that are associated with the feature of city in indices 4-8.

The same process is performed for node 2 using the same features of city and content delivery network. The following illustrates a calculation of information gain for the leaf node 2 for the features of city and content delivery network:

Splitting 2, node2, feature City $$\text{Entropy}_{before} = -\frac{1}{3}\log_2\left(\frac{1}{3}\right) - \frac{2}{3}\log_2\left(\frac{2}{3}\right) = 0.92$$

$$\text{Entropy}_{after} = \frac{1}{3} * \left(-\frac{1}{1}\log_2\left(\frac{1}{1}\right)\right) + \frac{2}{3} * \left(-\frac{2}{2}\log_2\left(\frac{2}{2}\right)\right) = 0$$

$$\text{Information}_{gain} = \text{Entropy}_{before} - \text{Entropy}_{after} = 0.92$$

Splitting 2, node2, decision feature $$\text{Entropy}_{before} = -\frac{1}{3}\log_2\left(\frac{1}{3}\right) - \frac{2}{3}\log_2\left(\frac{2}{3}\right) = 0.92$$

$$\text{Entropy}_{after} = \frac{3}{3} * \left(-\frac{1}{3}\log_2\left(\frac{1}{3}\right) - \frac{2}{3}\log_2\left(\frac{2}{3}\right)\right) = 0.92$$

$$\text{Information}_{gain} = \text{Entropy}_{before} - \text{Entropy}_{after} = 0$$

For node 2, the information gain is 0.92 for the feature of city compared to 0 for the decision feature of content delivery network. As a result, the feature of city is selected for node 2. Referring to FIG. 5, the indices of 1-3 that have the value of 4G are used because node 2 is associated with the value of 4G. Thus, there are two values of Paris and London that are associated with the feature of city in indices 1-3. The splitting of node 1 and node 2 using the two values produces two children nodes that contain two groups of data. This reaches the limit of four leaf nodes on a level and the generation of tree structure 600 is ended.

Tree structure 600 shows the predictions for the decision feature at 602-4, 602-5, 602-6, and 602-7. For example, for node 1, if the city is Paris, then the prediction is 0; and if the city is London, the prediction is 1. For node 2, if the city is Paris, the prediction is 1; and if the city is London the prediction is 0. The predicted values may be determined based on the combinations of the training data in FIG. 5. For example, the label of 0 when Wi-Fi and Paris exists in a session is shown in index 8. Also, when Wi-Fi and London are in the combination as shown in indices 4-7, the label is 1. Also, for node 2, when the network is 4G and the city is Paris, the label is 1 as shown in index 1. When the network is 4G and the city is London as shown in indices 2 and 3, the value is 0. It is noted that this may be a simple example and other methods for determining the predicted values may be used. For example, if different values exist for the same combination, a method to determine a value for the prediction may be used, such as using a majority, using an average for the value, etc.

The tree structure at 600 may be used in an inference phase to generate predictions. FIG. 6B depicts a table 604 that includes test samples according to some embodiments. A column 606 may indicate the playback session. The test samples may include information for network and city in columns 608 and 610. Column 612 and 614 show the prediction. For example, at 612, the prediction is shown when the content delivery network is content delivery network A and the prediction is shown in column 614 when the content delivery network is content delivery network B.

As can be seen in column 612 and column 614, there is no discrimination for the decision feature. That is, the prediction is 0 in indices 9 and 12 for both content delivery network A and content delivery network B. Also, for indices 10 and 11, the prediction is 1 when the content delivery network is content delivery network A and content delivery network B. The tree structure at 600 cannot determine which content delivery network may be optimal when the same combinations of network and city are used. The decision feature does not include any discrimination in the prediction because the information gain considered the decision feature of content delivery network not as informative as the other features, and ignores the feature in the tree structure.

Figures 7A, 7B:
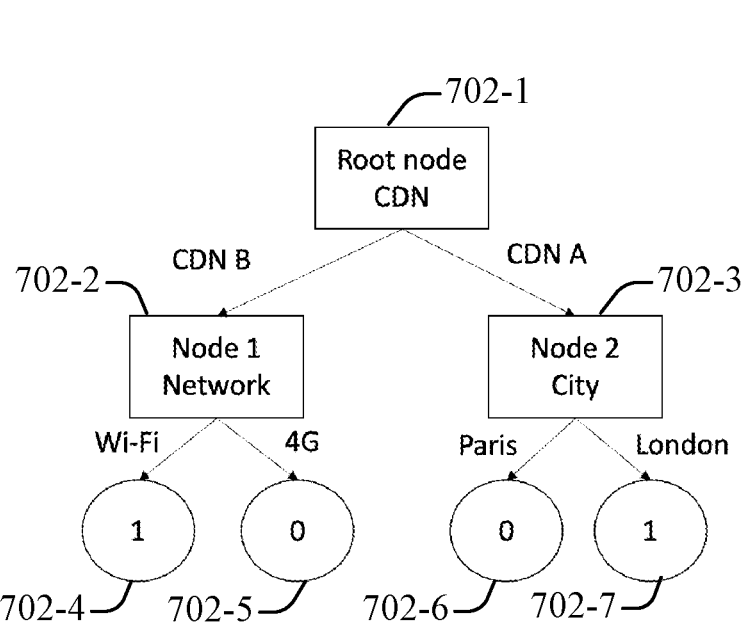
FIG. 7A depicts an example of a tree structure that uses decision aware splitting and gain-based splitting according to some embodiments.
FIG. 7B depicts a table that shows test samples according to some embodiments.

The following describes a tree structure that does include discrimination for the decision feature of content delivery network. FIG. 7A depicts an example of a tree structure at 700 that uses decision aware splitting and gain-based splitting according to some embodiments. A root node at 702-1 may use a decision aware splitting process according to some embodiments. For example, the decision feature is content delivery network, and the decision aware splitting process splits the root node using the values for the feature of content delivery network. In this example, in FIG. 5, the content delivery network may be content delivery network B in indices 1-6 and content delivery network A in indices 7-8. Thus, two leaf nodes are appended to the root node at 702-2 and 702-3, respectively. A node 1 at 702-2 is associated with the value of content delivery network B (CDN B) and a node 2 at 702-3 is associated with the value of content delivery network A (CDN A).

Prediction system 108 then performs a gain-based splitting process for node 1 at 702-2 and node 2 at 702-3. For example, prediction system 108 may compute the information gain for the features of network and city for node 1. The feature of content delivery network is not used because the value for the feature of content delivery network for each respective node is fixed. The details of the information gain calculation are omitted, but a person of skill in the art could calculate the information gain based on the training data in FIG. 5. Prediction system 108 selects the feature of network for node 1 based on it having a higher information gain.

Then, prediction system 108 computes the information gain for node 2 using the features of network and city. The feature of city has the highest information gain and is selected for node 2.

For node 1 at 702-2, the feature of network may have the values of 4G for indices 1-3 and Wi-Fi for indices 4-6 for content delivery network B. Prediction system 108 adds two leaf nodes at 702-4 and 702-5 for node 1. For node 2 at 702-3, the feature of city, indices 7 and 8 for content delivery network A are associated with Paris and London. Prediction system 108 adds two leaf nodes at 702-6 and 702-7 for node 2. The maximum of four leaf nodes is reached at this level.

Prediction system 108 assigns prediction values for the decision feature to the nodes at 702-4, 702-5, 702-6, and 702-7. The prediction may be the value of 1 for Wi-Fi at 702-4 and the value of 0 for a 4G at 702-5 for content delivery network B. The prediction values may be determined in different ways. For example, a majority of the values may be used, a mean, a median, etc. In some embodiments, the value of 1 is determined for Wi-Fi because for indices 4-6, the label of 1 is found in all the indices. The value for 4G is 0 because for indices 1-3, the value of 0 has a majority of 2 to 1.

For the node at 702-6, the value of 0 is assigned to content delivery network A in Paris based on index 8 having a label of 0. Also, the value of 1 is assigned to content delivery network A in London based on index 7 having a label of 1.

Using tree structure 700, the decision feature of content delivery network has discrimination in that a combination of values for city and network may result in different values for predictions for content delivery network A and content delivery network B. The following illustrates the discrimination for the decision feature. FIG. 7B depicts a table 704 that shows test samples according to some embodiments. Test samples 9-12 are similar to the test samples shown in FIG. 6B. However, the predictions of when content delivery network A is used and when content delivery network B is used are different. For example, for index 9, when the network is 4G and the city is London, the prediction may be 1 when content delivery network A is used, and prediction may be 0 when content delivery network B is used. The value of 0 for content delivery network B is determined based on taking the branch with content delivery network B from the root node to node 1 at 702-2, and then the branch with 4G from node 1 to the node at 702-5. The value of 1 for content delivery network A is determined based on taking the branch with content delivery network A from the root node to node 2 at 702-3, and then the branch with London from node 2 to the node at 702-7. Also, for index 12, when the network is Wi-Fi and the city is Paris, the prediction may be 0 when content delivery network A is used, and the prediction may be 1 when content delivery network B is used. The value of 1 for content delivery network B is determined based on taking the branch with content delivery network B from the root node to node 1 at 702-2, and then the branch with Wi-Fi from node 1 to the node at 702-4. The value of 0 for content delivery network A is determined based on taking the branch with content delivery network A from the root node to node 2 at 702-3, and then the branch with Paris from node 2 to the node at 702-6. Accordingly, there is discrimination for the decision feature that is preserved using tree structure 700 as the same combination in indices 9 and 12 result in different predictions for content delivery network A and content delivery network B. This is in comparison to table 604 in FIG. 6B where there was no discrimination between the predictions for the content delivery networks in indices 9 through 12.

In conclusion, the training includes an additional stage that uses a decision aware splitting process before performing a gain-based splitting process. The decision aware splitting process may ensure that each decision for the decision feature has a separate subtree, which preserves the individuality and differences between decisions for the decision feature. The training of subsequent nodes is performed based on gain-based splitting. The tree may thus be decision aware, but also ensures the accuracy may not compromised because a gain-based splitting process is also used for a majority of the tree structure.

The above example shows the generation of a tree structure using a one type of decision tree. The process may be applied to more complex decision tree generation, such as when processing may use more than two values for the decision feature.

Profile Selection

In video streaming, the selection of an initial profile may determine which profile is used when the delivery of content starts. As is known, multiple profiles may be associated with different levels, with each level associated with a different a combination of bitrate or quality. The proper selection of the initial profile allows users with a good network connection to experience a high-quality profile while also preventing long video start times for users with a poor network connection by selecting a lower quality profile. To achieve this, the initial profile selection process predicts the performances of decisions for profiles before playback starts. For example, the predicted performance may be a video startup time and the decision may be the possible profiles that can be selected. The tree structure may represent an effective prediction model for selecting the initial profile.

Figures 8A, 8B:
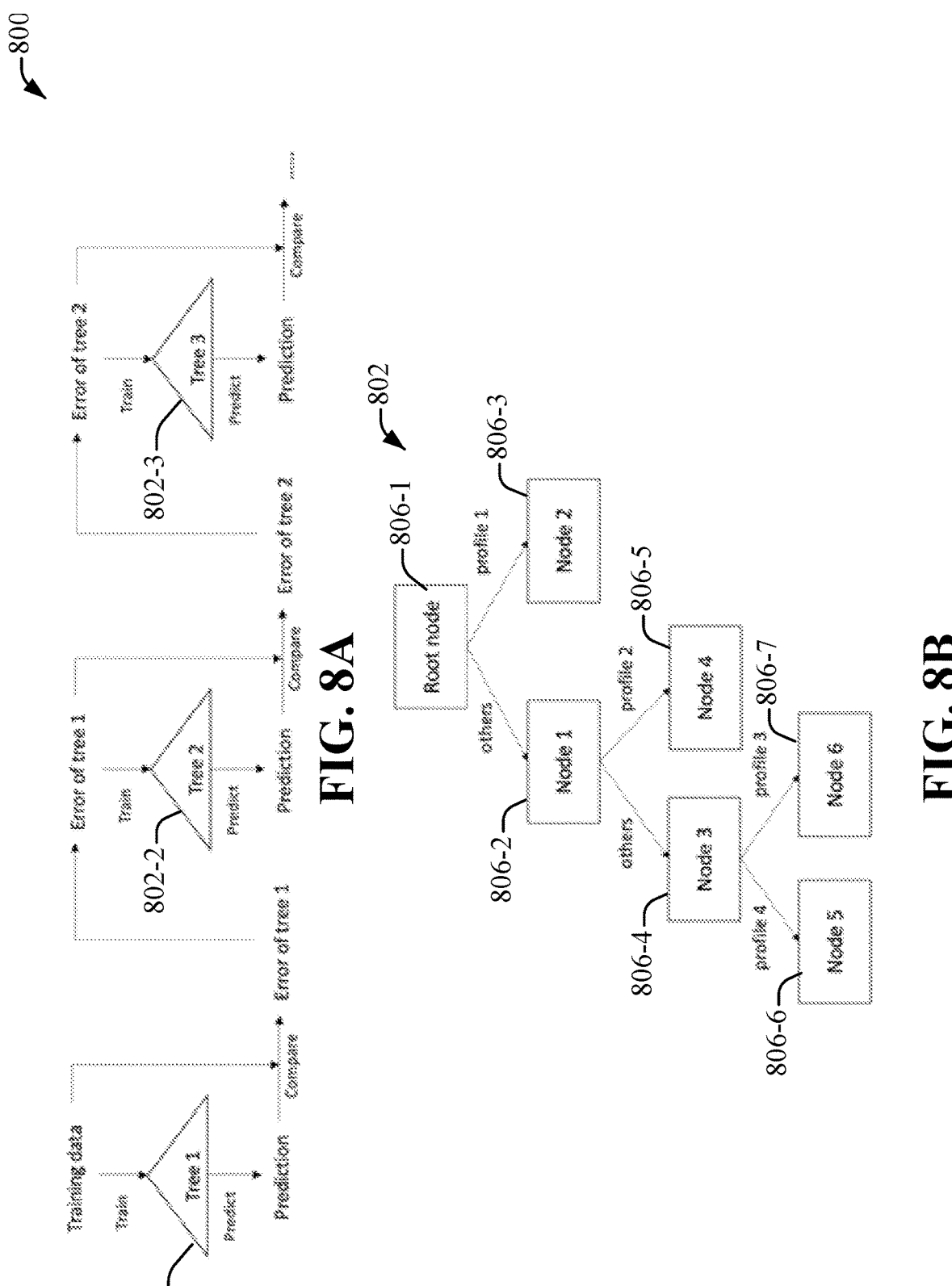
FIG. 8A shows an example of a tree structure that includes decision trees in a sequential structure according to some embodiments.
FIG. 8B shows an example of a respective tree from FIG. 8A according to some embodiments.

FIG. 8A depicts an example of a tree structure 800 for selecting profiles according to some embodiments. In some embodiments, the tree structure may be a gradient boost decision tree (GBDT) for initial profile selection.

The training data may be based on features associated with selecting profiles where there may be more than two profiles. In some embodiments, the training data may include data for sessions that include features and labels for video startup time. The model may take the features as input and predict the video startup time. Some examples of the features are shown in Table I:

TABLE I

| Feature | Description |
| --- | --- |
| Device platform | The player device platform for the current session. |
| Region | The region where the client device is located. |
| City | The city where the client device is located. |
| Network type | The kind of current network of the client device, e.g., 'Wi-Fi', '4G', etc. |
| Profile | The type of initial profile. |

Prediction system 108 may build cascaded decision trees in a sequential manner where each tree is trained to correct the mistakes made by the previous trees. FIG. 8A shows an example of a structure 800 that includes tree structures in a sequential structure according to some embodiments. Tree structures at 802-1, 802-2, and 802-3 (collectively 802) are shown. At 802-1, a first tree 1 is trained. Then, at 802-2, a second tree 2 is trained based on the error of tree 1. Then, at 802-3, a third tree 3 is trained using an error of tree 2. This process continues for as many trees that are included in structure 800. Every tree takes the same input of features, but is trained with different labels. The summation of the prediction of all trees is the final prediction. Thus, every tree starts with the same tree structure because decision aware splitting is used to split use the root node of each sub-tree using profiles.

The following describes an example of using a decision aware splitting process for respective trees in FIG. 8A. FIG. 8B shows an example of a tree structure 802 from FIG. 8A according to some embodiments. Tree 802 may be used for any of the trees in FIG. 8A. Tree structure 802 includes a root node at 806-1 and leaf nodes at 806-2 to 806-7. Multiple nodes use a decision aware splitting process relative to the decision feature of initial profiles. The decision aware splitting process may be performed multiple times, such as sequentially, such that each decision is associated with a leaf node. For example, a root node 806-1 is split using other profiles and profile 1. Other profiles may be profiles other than profile 1, such as profiles 2-4. Then, Node 1 is split using other profiles and profile 2. Other profiles may be profiles other than profile 2, such as profiles 3-4. Finally, node 3 at 806-4 is split using Profile 4 and Profile 3. Accordingly, when there are four profiles to select, decision aware splitting builds the tree with four leaf nodes that correspond to the four profiles.

In the training phase, modification is made to the construction of each individual subtree. For example, each profile may be trained individually allowing the learning process of each profile to be developed separately. For example, the learning of profile 1 is developed using node 2 at 806-3. Also, the learning of profile 2 is developed from Node 4 at 806-5. Similarly, the learning of profile 4 is developed using Node 5 at 806-6 and the learning of profile 3 is developed using Node 6 at 806-7. This may result in different subtree structures under node 2, node 4, node 5, and node 6 based on the training data (not shown). As can be seen, each decision of the decision feature of initial profiles may be separated into separate subtrees and tree structure 802 is decision aware. Although tree structure 802 is described as being generated for a gradient boost decision tree, the process may be used to generate other types of tree structures.

CONCLUSION

Accordingly, prediction system 108 builds a tree structure that is a unified model. The tree structure is trained based on the knowledge of all values of a decision feature in the training data. The resulting tree structure is forced to apply discrimination to the decision feature. The tree structure provides the discrimination for the decision feature even if the decision feature is not as informative as the other features. The tree structure thus enhances the discrimination of decisions using the decision feature discriminating training approach, which ensures that the differences between decisions are captured and preserved in the tree structure that is generated. The retention of model accuracy is also provided by using the gain-based splitting process for a majority of the nodes. The proposed tree structure is also easily integrated into an infrastructure, such as a streaming infrastructure, that includes workflows for decision tree structure based prediction models. The tree structure that is generated may operate similarly to a tree structure that is generated using only gain-based splitting. However, the tree structure using decision aware splitting and gain-based splitting may be decision aware and also more cost effective. As discussed above, a single unified tree may be used instead of separate trees. Also, as the decision space increases, the cost savings increases with respect to resource use.

System

Figure 9:
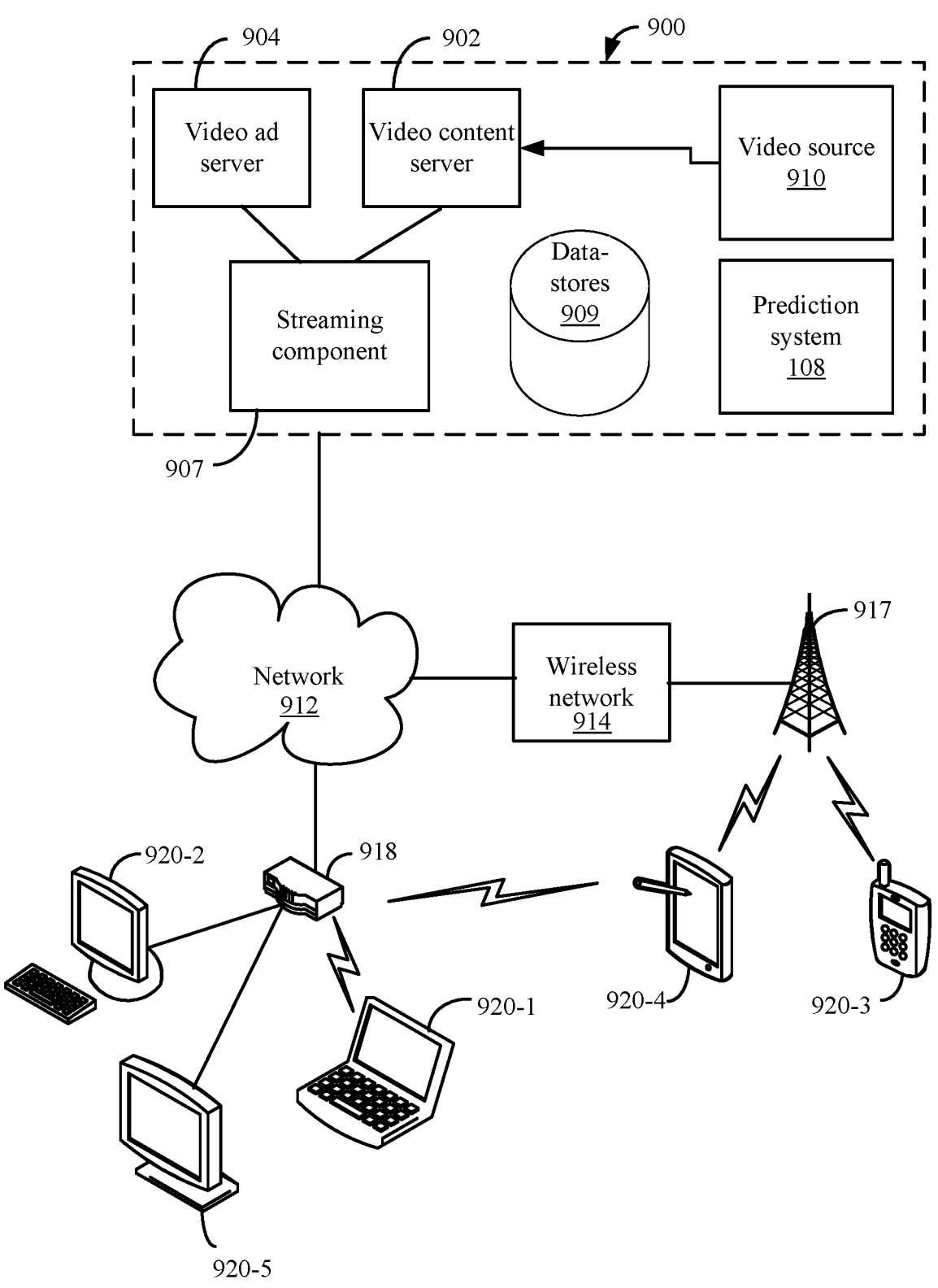
FIG. 9 depicts a video streaming system in communication with multiple client devices via one or more communication networks according to one embodiment.

Features and aspects as disclosed herein may be implemented in conjunction with a video streaming system 900 in communication with multiple client devices via one or more communication networks as shown in FIG. 9. Aspects of the video streaming system 900 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 900, video data may be obtained from one or more sources for example, from a video source 910, for use as input to a video content server 902. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner or transcoder. The input video data may comprise video clips or programs of various types, for example, television episodes, motion pictures, and other content produced as primary content of interest to consumers. The video data may also include audio or only audio may be used.

The video streaming system 900 may include one or more computer servers or modules 902, 904, and 907 distributed over one or more computers. Each server 902, 904, 907 may include, or may be operatively coupled to, one or more data stores 909, for example databases, indexes, files, or other data structures. A video content server 902 may access a data store (not shown) of various video segments. The video content server 902 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 904 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 900, a public service message, or some other information. The video advertising server 904 may serve the video advertising segments as directed by a user interface controller (not shown). The video streaming system 900 also may include prediction system 109.

The video streaming system 900 may further include an integration and streaming component 907 that integrates video content and video advertising into a streaming video segment. For example, streaming component 907 may be a content server or streaming media server. A controller (not shown) may determine the selection or configuration of advertising in the streaming video based on any suitable algorithm or process. The video streaming system 900 may include other modules or units not depicted in FIG. 9, for example, administrative servers, commerce servers, network infrastructure, advertising selection engines, and so forth.

The video streaming system 900 may connect to a data communication network 912. A data communication network 912 may comprise a local area network (LAN), a wide area network (WAN), for example, the Internet, a telephone network, a wireless network 914 (e.g., a wireless cellular telecommunications network (WCS)), or some combination of these or similar networks.

One or more client devices 920 may be in communication with the video streaming system 900, via the data communication network 912, wireless network 914, or another network. Such client devices may include, for example, one or more laptop computers 920-1, desktop computers 920-2, "smart" mobile phones 920-3, tablet devices 920-4, network-enabled televisions 920-5, or combinations thereof, via a router 918 for a LAN, via a base station 917 for wireless network 914, or via some other connection. In operation, such client devices 920 may send and receive data or instructions to the system 900, in response to user input received from user input devices or other input. In response, the system 900 may serve video segments and metadata from the data store 909 responsive to selection of media programs to the client devices 920. Client devices 920 may output the video content from the streaming video segment in a media player using a display screen, projector, or other video output device, and receive user input for interacting with the video content.

Distribution of audio-video data may be implemented from streaming component 907 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth, and structure of those files, delivers just the amount of data necessary to play the video, at the rate needed to play it. Streaming media servers may also account for the transmission bandwidth and capabilities of the media player on the destination client. Streaming component 907 may communicate with client device 920 using control messages and data messages to adjust to changing network conditions as the video is played. These control messages can include commands for enabling control functions such as fast forward, fast reverse, pausing, or seeking to a particular part of the file at the client.

Since streaming component 907 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 907 may use TCP-based protocols, such as HyperText Transfer Protocol (HTTP) and Real Time Messaging Protocol (RTMP). Streaming component 907 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 10:
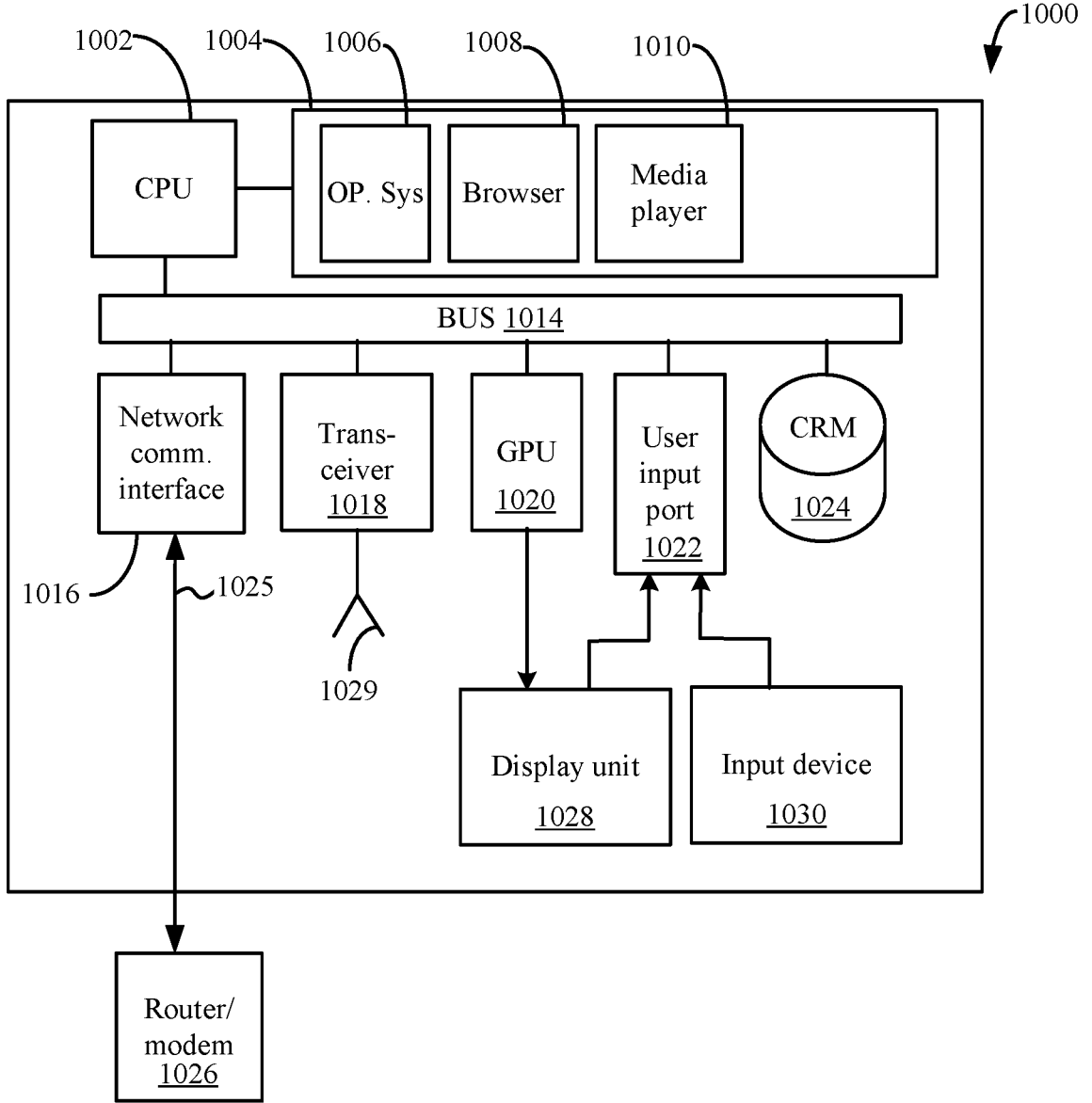
FIG. 10 depicts a diagrammatic view of an apparatus for viewing video content.

Referring to FIG. 10, a diagrammatic view of an apparatus 1000 for viewing video content and advertisements is illustrated. In selected embodiments, the apparatus 1000 may include a processor (CPU) 1002 operatively coupled to a processor memory 1004, which holds binary-coded functional modules for execution by the processor 1002. Such functional modules may include an operating system 1006 for handling system functions such as input/output and memory access, a browser 1008 to display web pages, and media player 1010 for playing video. The memory 1004 may hold additional modules not shown in FIG. 10, for example modules for performing other operations described elsewhere herein.

A bus 1014 or other communication components may support communication of information within the apparatus 1000. The processor 1002 may be a specialized or dedicated microprocessor configured or operable to perform particular tasks in accordance with the features and aspects disclosed herein by executing machine-readable software code defining the particular tasks. Processor memory 1004 (e.g., random access memory (RAM) or other dynamic storage device) may be connected to the bus 1014 or directly to the processor 1002, and store information and instructions to be executed by a processor 1002. The memory 1004 may also store temporary variables or other intermediate information during execution of such instructions.

A computer-readable medium in a storage device 1024 may be connected to the bus 1014 and store static information and instructions for the processor 1002; for example, the storage device (CRM) 1024 may store the modules for operating system 1006, browser 1008, and media player 1010 when the apparatus 1000 is powered off, from which the modules may be loaded into the processor memory 1004 when the apparatus 1000 is powered up. The storage device 1024 may include a non-transitory computer-readable storage medium holding information, instructions, or some combination thereof, for example instructions that when executed by the processor 1002, cause the apparatus 1000 to be configured or operable to perform one or more operations of a method as described herein.

A network communication (comm.) interface 1016 may also be connected to the bus 1014. The network communication interface 1016 may provide or support two-way data communication between the apparatus 1000 and one or more external devices, e.g., the streaming system 900, optionally via a router/modem 1026 and a wired or wireless connection 1025. In the alternative, or in addition, the apparatus 1000 may include a transceiver 1018 connected to an antenna 1029, through which the apparatus 1000 may communicate wirelessly with a base station for a wireless communication system or with the router/modem 1026. In the alternative, the apparatus 1000 may communicate with a video streaming system 900 via a local area network, virtual private network, or other network. In another alternative, the apparatus 1000 may be incorporated as a module or component of the system 900 and communicate with other components via the bus 1014 or by some other modality.

The apparatus 1000 may be connected (e.g., via the bus 1014 and graphics processing unit 1020) to a display unit 1028. A display 1028 may include any suitable configuration for displaying information to an operator of the apparatus 1000. For example, a display 1028 may include or utilize a liquid crystal display (LCD), touchscreen LCD (e.g., capacitive display), light emitting diode (LED) display, projector, or other display device to present information to a user of the apparatus 1000 in a visual display.

One or more input devices 1030 (e.g., an alphanumeric keyboard, microphone, keypad, remote controller, game controller, camera, or camera array) may be connected to the bus 1014 via a user input port 1022 to communicate information and commands to the apparatus 1000. In selected embodiments, an input device 1030 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1028, for example using a touch sensitive screen. A cursor control device may communicate direction information and command selections to the processor 1002 and control cursor movement on the display 1028. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:

receiving a data structure for an auto decision process for predicting a prediction value for a decision value of a plurality of decision features, wherein:

the decision feature selects a content delivery network in a plurality of content delivery networks for delivering content to a client device or selects a profile of a plurality of profiles for delivering the content at different bitrates, the data structure is generated using a decision aware splitting process that splits a node in the data structure using the decision feature and a metric-based splitting process that splits other nodes of the data structure by evaluating features other than the decision feature in the plurality of features using a metric, a prediction value in a plurality of prediction values that are defined for the decision feature is added to leaf nodes in a last split of leaf nodes in the data structures, each leaf node has one of the plurality of prediction values added, the prediction value is determined based on a combination of features associated with the leaf node and respective feature values associated with edges for the combination of features, and the prediction values for the leaf nodes discriminates between decisions of the decision feature;

determining feature values for a combination of features for a playback session;

evaluating the data structure using the combination of features to determine a plurality of feature values, wherein feature values in the plurality of feature values are associated with edges connected to leaf nodes;

using first feature values in the plurality of feature values to select a first leaf node, wherein the first leaf node has a first prediction value added;

using second feature values in the plurality of feature values to select a second leaf node, wherein the second leaf node has a second prediction value added, wherein the first prediction value is different from the second prediction value due to using the decision aware splitting process that splits the node in the data structure using the decision feature; and generating a decision for the playback session by selecting a decision value in the plurality of decision values based on the different prediction values in the first prediction value and the second prediction value to select one of the plurality of content delivery networks to deliver the content or one of the plurality of profiles of a bitrate.

2. The method of claim 1, wherein the data structure is a unified model that is used to generate the plurality of prediction values for the plurality of feature values for the decision feature.

3. The method of claim 1, wherein:

the decision aware splitting process splits a first node of the data structure into a plurality of leaf nodes using the plurality of feature values for the decision feature;

the metric-based splitting process performs:

for leaf nodes in the plurality of leaf nodes, generating a metric value for a metric for features in the plurality of features, wherein the metric value is based on selecting a respective feature for a respective leaf node;

selecting a feature for respective leaf nodes based on the metric value that is generated for features for the respective leaf nodes; and splitting the plurality of leaf nodes using a plurality of feature values for the selected feature for respective leaf nodes.

4. A method comprising:

receiving data that includes a plurality of features, wherein a first feature in the plurality of features is designated as a decision feature in which a prediction for a plurality of prediction values that are defined for the decision feature is generated using a data structure, wherein the decision feature selects a content delivery network in a plurality of content delivery networks for delivering content to a client device or selects a profile of a plurality of profiles for delivering the content at different bitrates;

using a decision aware splitting process, splitting a first node of the data structure into a plurality of leaf nodes using a plurality of decision values for the first feature from the data;

using a metric-based splitting process, performing:

for leaf nodes in the plurality of leaf nodes, generating a metric value for a metric for features other than the first feature in the plurality of features from the data, wherein the metric value is based on selecting a respective feature for a respective leaf node;

adding a feature for respective leaf nodes based on the metric value that is generated for features for the respective leaf nodes;

splitting the plurality of leaf nodes using a plurality of feature values for the selected feature for respective leaf nodes, wherein feature values in the plurality of feature values are associated with edges connected to leaf nodes in the plurality of leaf nodes;

ending the metric-based splitting process when a criterium is met based on the data structure;

selecting a respective prediction value from the plurality of prediction values for the first feature and adding the respective prediction value to each leaf node in a last split of leaf nodes to the data structure, wherein:

the prediction value is determined based on a combination of features associated with the leaf node and respective feature values associated with edges for the combination of features, each leaf node has one of the plurality of prediction values added, the prediction values for the leaf nodes discriminates between values of the decision feature to select one of the plurality of content delivery networks to deliver the content or one of the plurality of profiles of a bitrate, a first leaf node has a first prediction value added and a second leaf node has a second prediction value added, and the first prediction value is different from the second prediction value due to using the decision aware splitting process that splits the node in the data structure using the decision feature; and outputting the data structure based on the splitting of the first node and the splitting of the plurality of leaf nodes.

5. The method of claim 4, wherein the first feature in the plurality of features is used during the decision aware splitting process and not in the metric-based splitting process.

6. The method of claim 4, wherein the first node comprises a root node of the data structure.

7. The method of claim 4, wherein the first node comprises a node after a root node of the data structure.

8. The method of claim 4, wherein the data structure comprises a tree structure that includes nodes and links between nodes.

9. The method of claim 4, wherein the first feature is automatically selected for splitting the first node based on using the decision aware splitting process.

10. The method of claim 4, wherein the first feature is not used to split nodes using the metric-based splitting process.

11. The method of claim 4, further comprising:

adding the plurality of prediction values to the data structure, wherein the plurality of prediction values are configured to predict a performance for the plurality of feature values for the first feature.

12. The method of claim 11, wherein the plurality of prediction values are determined based on the data, wherein the data is based on a delivery of the content.

13. The method of claim 4, wherein the metric comprises an information gain, wherein a higher metric value for the metric indicates that more information is gained by selecting the respective feature for a leaf node.

14. The method of claim 4, wherein:

the data includes data for a delivery of the content, and the data structure is used to determine a decision for the delivery of the content.

15. The method of claim 4, wherein the decision feature selects a profile based on a current bandwidth that is determined during a delivery of the content or selects the content delivery network to switch to during the delivery of thecontent.

16. The method of claim 4, wherein using the metric-based splitting process comprises:

adding a new plurality of leaf nodes for a leaf node in the plurality of leaf nodes;

selecting a feature for respective leaf nodes in the new plurality of leaf nodes based on a metric value that is generated for the respective leaf nodes; and splitting the plurality of leaf nodes using a plurality of feature values for the selected feature.

17. The method of claim 4, wherein using the metric-based splitting process comprises:

ending the metric-based splitting process when the criterium of a number of leaf nodes or a number of levels is met based on the data structure.

18. The method of claim 4, wherein the data structure comprises a unified data structure to determine predictions for the plurality of feature values for the decision feature.

19. A non-transitory computer-readable storage medium having stored thereon computer executable instructions, which when executed by a computing device, cause the computing device to be operable for:

receiving data that includes a plurality of features, wherein a first feature in the plurality of features is designated as a decision feature in which a prediction for a plurality of prediction values that are defined for the decision feature is generated using a data structure, wherein the decision feature selects a content delivery network in a plurality of content delivery networks for delivering content to a client device or selects a profile of a plurality of profiles for delivering the content at different bitrates;

using a decision aware splitting process, splitting a first node of the data structure into a plurality of leaf nodes using a plurality of decision values for the first feature from the data;

using a metric-based splitting process, performing:

for leaf nodes in the plurality of leaf nodes, generating a metric value for a metric for features other than the first feature in the plurality of features from the data, wherein the metric value is based on selecting a respective feature for a respective leaf node;

adding a feature for respective leaf nodes based on the metric value that is generated for features for the respective leaf nodes;

splitting the plurality of leaf nodes using a plurality of feature values for the selected feature for respective leaf nodes, wherein feature values in the plurality of feature values are associated with edges connected to leaf nodes in the plurality of leaf nodes;

ending the metric-based splitting process when a criterium is met based on the data structure;

selecting a respective prediction value from the plurality of prediction values for the first feature and adding the respective prediction value to each leaf node in a last split of leaf nodes to the data structure, wherein:

the prediction value is determined based on a combination of features associated with the leaf node and respective feature values associated with edges for the combination of features, each leaf node has one of the plurality of prediction values added;

the prediction values for the leaf nodes discriminates between values of the decision feature to select one of the plurality of content delivery networks to deliver the content or one of the plurality of profiles of a bitrate, a first leaf node has a first prediction value added and a second leaf node has a second prediction value added, and the first prediction value is different from the second prediction value due to using the decision aware splitting process that splits the node in the data structure using the decision feature; and outputting the data structure based on the splitting of the first node and the splitting of the plurality of leaf nodes.

20. The non-transitory computer-readable storage medium of claim 19, wherein the first feature in the plurality of features is used during the decision aware splitting process and not in the metric-based splitting process.

* * * * *